(12) United States Patent
Kennedy

(10) Patent No.: US 8,228,201 B2
(45) Date of Patent: *Jul. 24, 2012

(54) PLACARD HAVING EMBEDDED RFID DEVICE FOR TRACKING OBJECTS

(75) Inventor: Todd B. Kennedy, Gates Mills, OH (US)

(73) Assignee: MPT, Inc., Willoughby, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/082,070

(22) Filed: Apr. 7, 2011

(65) Prior Publication Data

US 2011/0180607 A1    Jul. 28, 2011

Related U.S. Application Data

(63) Continuation of application No. 12/191,088, filed on Aug. 13, 2008, now Pat. No. 7,948,384.

(60) Provisional application No. 60/955,681, filed on Aug. 14, 2007.

(51) Int. Cl.
*G08B 13/14* (2006.01)

(52) U.S. Cl. .................... 340/572.8; 340/572.7; 235/492

(58) Field of Classification Search ............... 340/572.8, 340/572.7, 572.1, 539.13, 825.36; 235/385, 235/492
See application file for complete search history.

(56) References Cited

U.S. PATENT DOCUMENTS

| | | | |
|---|---|---|---|
| 3,854,229 | A | 12/1974 | Morgan |
| 3,974,311 | A | 8/1976 | Cherrin |
| 4,014,816 | A | 3/1977 | Hogan et al. |
| 4,090,464 | A | 5/1978 | Bishopp |
| 4,104,816 | A | 8/1978 | Pingeton |
| 4,253,899 | A | 3/1981 | Takemoto |
| 4,264,657 | A | 4/1981 | Tollette |
| 4,359,358 | A | 11/1982 | Hattemer |
| 4,363,685 | A | 12/1982 | White |
| 4,398,985 | A | 8/1983 | Eagon |
| 4,479,838 | A | 10/1984 | Dunsirn et al. |

(Continued)

FOREIGN PATENT DOCUMENTS

DE    4 028 276    3/1992

(Continued)

OTHER PUBLICATIONS

Letter from Scott Muirhead to Steven J. Solomon dated Jun. 1, 2011.

(Continued)

*Primary Examiner* — John A Tweel, Jr.
(74) *Attorney, Agent, or Firm* — Pearne & Gordon LLP

(57) ABSTRACT

A method of embedding an RFID device in a reusable object includes the steps of providing a placard including a plurality of layers, and providing an RFID device including an integrated circuit coupled to an antenna. In one example, the placard includes a top layer, upper intermediate layer, lower intermediate layer, bottom layer, and a plurality of adhesive layers. The method further includes the steps of embedding said RFID device in the placard between an adjacent two of said layers, and encoding the RFID device with information. The method further includes the steps of providing a pallet having a cavity extending into an interior of the pallet, inserting the RFID device into the cavity so that the RFID device is located entirely within the interior of said pallet, and non-removably securing the RFID device within the cavity. In one example, the pallet includes a support base and a top surface.

30 Claims, 7 Drawing Sheets

U.S. PATENT DOCUMENTS

| | | | |
|---|---|---|---|
| 4,521,267 | A | 6/1985 | Jacobson |
| 4,534,582 | A | 8/1985 | Howard |
| 4,642,256 | A | 2/1987 | Sato |
| 4,767,654 | A | 8/1988 | Riggsbee |
| 4,863,772 | A | 9/1989 | Cross |
| 4,872,707 | A | 10/1989 | deBruin |
| 4,876,131 | A | 10/1989 | Ashby et al. |
| 4,928,874 | A | 5/1990 | Henry et al. |
| 4,932,684 | A | 6/1990 | Vermeulen |
| 4,933,124 | A | 6/1990 | Duncan |
| 4,938,414 | A | 7/1990 | Lippert |
| 5,019,436 | A | 5/1991 | Schramer et al. |
| 5,021,273 | A | 6/1991 | Kobayashi |
| 5,056,827 | A | 10/1991 | Sasso |
| 5,129,976 | A | 7/1992 | Horikiri |
| 5,248,536 | A | 9/1993 | Du Katz |
| 5,383,568 | A | 1/1995 | Tusick |
| 5,417,790 | A | 5/1995 | Petrou |
| 5,574,470 | A | 11/1996 | de Vall |
| 5,628,858 | A | 5/1997 | Petrou |
| 5,682,143 | A | 10/1997 | Brady et al. |
| 5,705,852 | A | 1/1998 | Orihara et al. |
| 5,822,714 | A | 10/1998 | Cato |
| 5,841,365 | A | 11/1998 | Rimkus |
| 5,963,134 | A | 10/1999 | Bowers et al. |
| 6,078,259 | A | 6/2000 | Brady et al. |
| 6,107,920 | A | 8/2000 | Eberhardt et al. |
| 6,137,414 | A | 10/2000 | Federman |
| 6,144,301 | A | 11/2000 | Frieden |
| 6,145,231 | A | 11/2000 | Valiulis |
| 6,147,662 | A | 11/2000 | Grabau et al. |
| 6,195,006 | B1 | 2/2001 | Bowers et al. |
| 6,204,764 | B1 | 3/2001 | Maloney |
| 6,206,282 | B1 | 3/2001 | Hayes, Sr. et al. |
| RE37,164 | E | 5/2001 | Petrou |
| 6,226,912 | B1 | 5/2001 | Tackett |
| 6,229,445 | B1 | 5/2001 | Wack |
| 6,265,977 | B1 | 7/2001 | Vega et al. |
| 6,294,998 | B1 | 9/2001 | Adams |
| 6,327,972 | B2 | 12/2001 | Heredia et al. |
| 6,351,215 | B2 | 2/2002 | Rodgers et al. |
| 6,353,420 | B1 | 3/2002 | Chung |
| 6,441,736 | B1 | 8/2002 | Leighton |
| 6,451,154 | B1 | 9/2002 | Grabau et al. |
| 6,483,434 | B1 | 11/2002 | UmiKer |
| 6,496,382 | B1 | 12/2002 | Ferguson |
| 6,520,544 | B1 | 2/2003 | Mitchell et al. |
| 6,557,766 | B1 | 5/2003 | Leighton |
| 6,669,089 | B2 | 12/2003 | Cybulski et al. |
| 6,702,185 | B1 | 3/2004 | Zercher |
| 6,749,418 | B2 | 6/2004 | Muirhead |
| 6,770,509 | B2 | 8/2004 | Halope et al. |
| 6,773,653 | B2 | 8/2004 | Miller et al. |
| 6,814,287 | B1 | 11/2004 | Chang et al. |
| 6,857,714 | B2 | 2/2005 | Hohberger et al. |
| 6,891,110 | B1 | 5/2005 | Pennaz et al. |
| 6,943,678 | B2 | 9/2005 | Muirhead |
| 6,994,262 | B1 | 2/2006 | Warther |
| 7,077,489 | B2 | 7/2006 | Waters |
| 7,114,654 | B2 | 10/2006 | Chapman et al. |
| 7,135,979 | B2 | 11/2006 | Savagian |
| 7,151,979 | B2 | 12/2006 | Andersen et al. |
| 7,155,304 | B1 | 12/2006 | Charych |
| 7,180,419 | B2 | 2/2007 | Oakes et al. |
| 7,204,652 | B2 | 4/2007 | Warther |
| 7,211,163 | B2 | 5/2007 | Kennedy |
| D544,175 | S | 6/2007 | Valentinsson |
| 7,225,993 | B2 | 6/2007 | Warther |
| 7,259,678 | B2 | 8/2007 | Brown et al. |
| 7,271,726 | B2 | 9/2007 | Hollon |
| 7,273,165 | B2 | 9/2007 | Satake et al. |
| 7,323,990 | B2 | 1/2008 | Urban |
| 7,342,496 | B2 | 3/2008 | Muirhead |
| 7,374,102 | B2 | 5/2008 | Arnold et al. |
| 7,383,864 | B2 | 6/2008 | Hogerton et al. |
| 7,388,492 | B2 | 6/2008 | Watanabe |
| 7,416,121 | B2 | 8/2008 | Zimmerman |
| 7,416,628 | B2 | 8/2008 | Carver |
| 7,417,550 | B2 | 8/2008 | Brown et al. |
| 7,450,007 | B2 | 11/2008 | Cook et al. |
| 7,475,956 | B2 | 1/2009 | Waters |
| 7,649,463 | B2 | 1/2010 | Tuttle |
| 7,659,857 | B2 | 2/2010 | King |
| 7,698,179 | B2 | 4/2010 | Leung et al. |
| 7,841,281 | B2 | 11/2010 | Valentinsson |
| 7,948,384 | B1 * | 5/2011 | Kennedy ............... 340/572.8 |
| 2001/0012682 | A1 | 8/2001 | Kayanakis et al. |
| 2002/0192856 | A1 | 12/2002 | Halope et al. |
| 2003/0145945 | A1 | 8/2003 | Kennedy |
| 2003/0181227 | A1 | 9/2003 | Toshiyuki |
| 2005/0149414 | A1 | 7/2005 | Schrodt et al. |
| 2006/0080819 | A1 | 4/2006 | McAllister |
| 2006/0097849 | A1 | 5/2006 | Dando |
| 2006/0208094 | A1 | 9/2006 | Ishikawa et al. |
| 2006/0208893 | A1 | 9/2006 | Anson |
| 2006/0232412 | A1 | 10/2006 | Tabacman |
| 2006/0255948 | A1 | 11/2006 | Runyon et al. |
| 2006/0255949 | A1 | 11/2006 | Roeder et al. |
| 2006/0255950 | A1 | 11/2006 | Roeder et al. |
| 2006/0290505 | A1 | 12/2006 | Conwell |
| 2006/0290514 | A1 | 12/2006 | Sakama et al. |
| 2007/0024463 | A1 | 2/2007 | Hall et al. |
| 2007/0040684 | A1 | 2/2007 | McAllister |
| 2007/0057050 | A1 | 3/2007 | Kuhno et al. |
| 2007/0131781 | A1 | 6/2007 | Roth et al. |
| 2007/0256788 | A1 | 11/2007 | Ford et al. |
| 2008/0074267 | A1 | 3/2008 | Sugiyama |
| 2008/0218354 | A1 | 9/2008 | Lorentz et al. |
| 2008/0286506 | A1 | 11/2008 | Kennedy |
| 2008/0303639 | A1 | 12/2008 | Ford et al. |
| 2010/0134260 | A1 | 6/2010 | McDaniel et al. |

FOREIGN PATENT DOCUMENTS

| | | |
|---|---|---|
| DE | 4443980 A1 | 6/1996 |
| FR | 2 649 522 | 1/1991 |
| FR | 2697801 A1 | 5/1994 |
| GB | 1 090 590 | 11/1967 |
| JP | 2004-66669 | 3/2004 |
| KR | 1997-0003934 | 3/1997 |
| WO | 2009/012463 A2 | 1/2009 |

OTHER PUBLICATIONS

AI Technology, Inc., Product Data Sheet for SOLDER-SUB ESS8450, Rev. D, Aug. 30, 2000, Princeton Junction, NJ.

AI Technology, Inc., Product Data Sheet for SOLDER-SUB PSS8150, Rev. D, Jan. 8, 2007, Princeton Junction, NJ.

Michael Ollivier, "RFID enhances materials handling," Sensor Review, vol. 15, No. 1, 1995, pp. 36-39.

IRS Package 1040-5, mailed by IRS in 2006, but believed similar to that used and mailed to taxpayers by IRS at least as early as 2000.

* cited by examiner

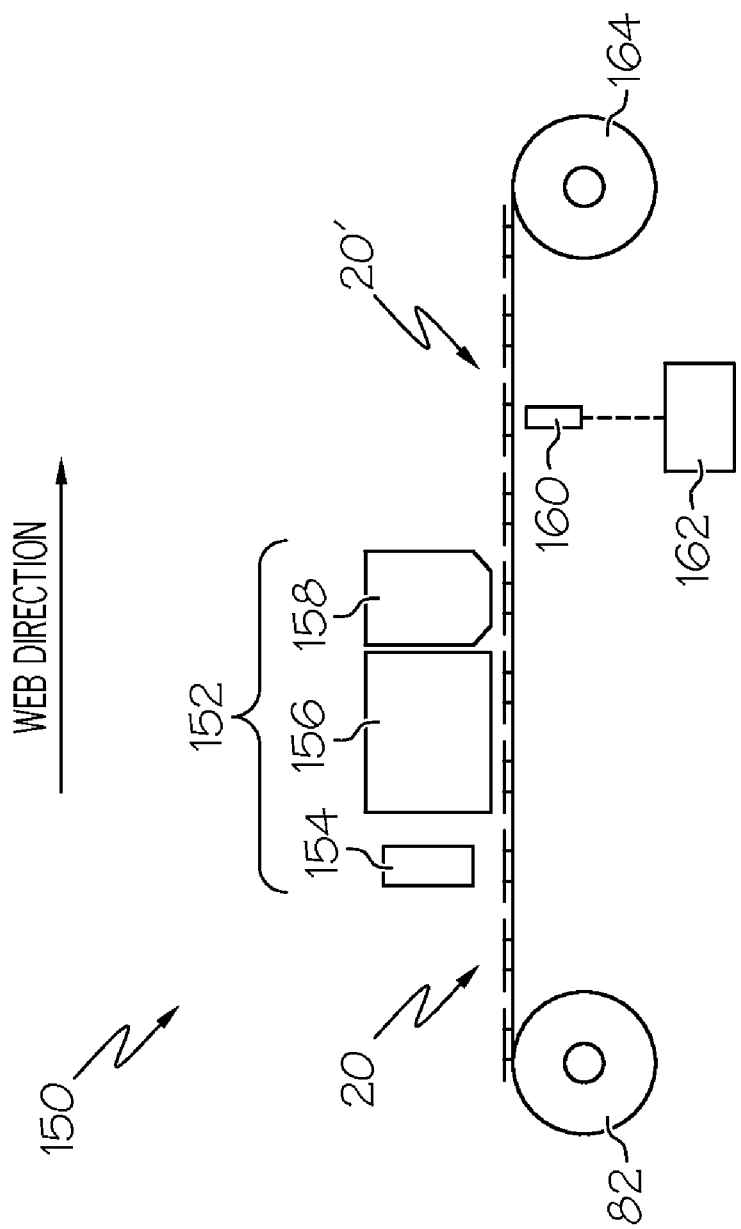

PLACARD HAVING EMBEDDED RFID DEVICE FOR TRACKING OBJECTS

RELATED APPLICATIONS

This application is a continuation of U.S. patent application Ser. No. 12/191,088, filed Aug. 13, 2008, which claims the benefit of U.S. Provisional Application No. 60/955,681, filed on Aug. 14, 2007. The entire disclosures of these applications are hereby incorporated herein by reference.

FIELD OF THE INVENTION

The present invention relates generally to a placard having an embedded RFID device for tracking objects, and more particularly, to a placard having an embedded RFID device for tracking reusable objects.

BACKGROUND OF THE INVENTION

In the global marketplace, goods are often stored, transported and shipped on pallets. Conventional pallets are made of wood as known in the art, but may be made of other materials or combinations of other materials, or of wood with other materials.

The pallets often are owned by an independent third party, and provided to the distributors, marketers, shippers and retailers of goods on a rental or lease basis. The owner of the pallets has an interest to track the whereabouts of its pallets, both to ensure that proper rental or lease payments are made and to ensure that pallets are not transported to locations that are not permitted. The loss of pallets also can be a problem.

Radio frequency identification (RFID) devices can be associated with or attached to pallets as a means of tracking them. The RFID devices can be designed to work in conjunction with a network of RFID readers or interrogators at specified locations, which collect tracking data from the RFID devices associated with specific pallets when those pallets pass through the readers' interrogation area, which can be passive (e.g. all pallets entering the docking-bay door of a warehouse can be automatically scanned) or manual (e.g. dock worker manually scans a pallet when it arrives at his workstation).

Pallets are often mistreated. Even when they are not, they meet very demanding and harsh conditions. Therefore, it is desirable that the RFID device be shielded as much as is practical from the harsh conditions seen by pallets when in use in global commerce.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with one aspect, a method of embedding an RFID device in a reusable object includes the steps of providing a placard including a plurality of layers, and providing an RFID device including an integrated circuit coupled to an antenna. The method further includes the steps of embedding said RFID device in the placard between an adjacent two of said plurality of layers, and encoding the RFID device with information. The method further includes the steps of providing a pallet having a cavity extending into an interior of the pallet, inserting the RFID device into the cavity so that the RFID device is located entirely within the interior of said pallet, and non-removably securing the RFID device within the cavity.

In accordance with another aspect, a method of embedding an RFID device in a reusable object includes the steps of providing a placard including at least a top layer, an upper intermediate layer, a lower intermediate layer, and a bottom layer, and providing an RFID device including an integrated circuit coupled to an antenna. The method further includes the steps of encoding the RFID device with information, and embedding said RFID device in the placard between adjacent layers to form an embedded RFID placard. The method further includes the steps of providing a pallet including a support base, a top surface, and a cavity extending into an interior of at least one of said support base and top surface. The method further includes the steps of inserting the embedded RFID placard into said cavity so that the embedded RFID placard is located entirely within said, and non-removably securing said embedded RFID placard within said cavity.

In accordance with yet another aspect, an embedded RFID device for a reusable object is provided, including a placard including at least a top layer, an upper intermediate layer, a lower intermediate layer, a bottom layer, and a plurality of adhesive layers located between adjacent ones of said top layer, upper intermediate layer, lower intermediate layer, and bottom layer. An RFID device is embedded in the placard between adjacent layers and including an integrated circuit coupled to an antenna. A pallet includes an interior cavity that is integrally formed as a portion of said pallet and adapted to completely receive said placard therein, and a sealing device is adapted to non-removably seal said placard within said cavity.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 10 illustrates a schematic view of another example manufacturing process utilizing a generally continuous web.

DESCRIPTION OF EXAMPLE EMBODIMENTS

Figure 1A:
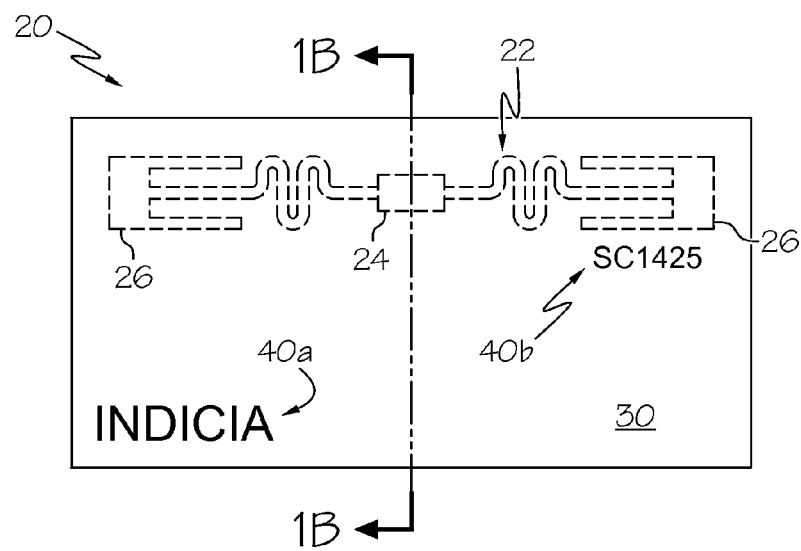
FIG. 1A illustrates an example RFID device.

An example embodiment of a device that incorporates aspects of the present invention is shown in the drawings. It is to be appreciated that the shown example is not intended to be a limitation on the present invention. For example, one or more aspects of the present invention can be utilized in other embodiments and even other types of devices.

Turning to the shown example of FIG. 1A, an RFID device 22 can be provided embedded within a laminate placard structure 20. Generally, RFID devices are readily known in the art. In one illustrative embodiment, each RFID tag may include a unique code that specifically identifies it. Illustrative information provided by each RFID tag may include, e.g., an identifier, a serial number, a part type, manufacturer information, owner information, etc.

Within the context of this disclosure, an RFID device may be an electronic circuit adapted to receive incoming radio frequency energy through its antenna, and operate that circuitry to modulate a radio frequency signal to transmit data out through the antenna. The RFID device can be passive such that it uses a portion of the incoming radio frequency energy to power its own circuitry, or alternatively the RFID device can be active such that it is coupled to a power source that at least partially powers its own circuitry. However, an active RFID device can still utilize a portion of the incoming radio frequency energy to power its own circuitry. An RFID device may also contain circuitry to perform additional operations, such as logic circuitry, memory, sensors, etc. The RFID device may use any feasible RFID technology currently existing or yet to be developed.

The RFID device 22 can generally include an RFID antenna and chip assembly including an IC (integrated circuit) chip 24 and one or more antennas 26, and/or many other features, power supplies, and circuitry that may be desired for an RFID application. The RFID device 22 can also include various associated circuitry, such as a time/temperature sensor, accelerometers, other environmental sensor, etc. The RFID device 22 can also include a memory (not shown) that stores pre-selected information, which can be, e.g., a unique code number to be associated with a specific pallet. The RFID device 22 can also include a transceiver circuit capable to transmit stored information from the memory when it is interrogated by an appropriate interrogation signal, as well as a radio-frequency antenna to pick up the interrogation signal and transmit the memory information. The RFID memory can be programmable or not, capable to receive and store new information or not. Other details of RFID devices 22 and how they work are known or conventional in the art, and will not be described here. As will be discussed more fully herein, the various elements of the RFID device 22 can be laminated (e.g., using thin metal films or the like) or printed (e.g., using conductive inks or the like) on a carrier substrate, including the IC chip 24 and antennas 26, though the components of the RFID device 22 can also be provided in various manners. Moreover, the IC chip 24 can be provided to the carrier substrate before, during, or even after the other structure of the RFID device 22, such as the antennas 26.

Figure 1B:
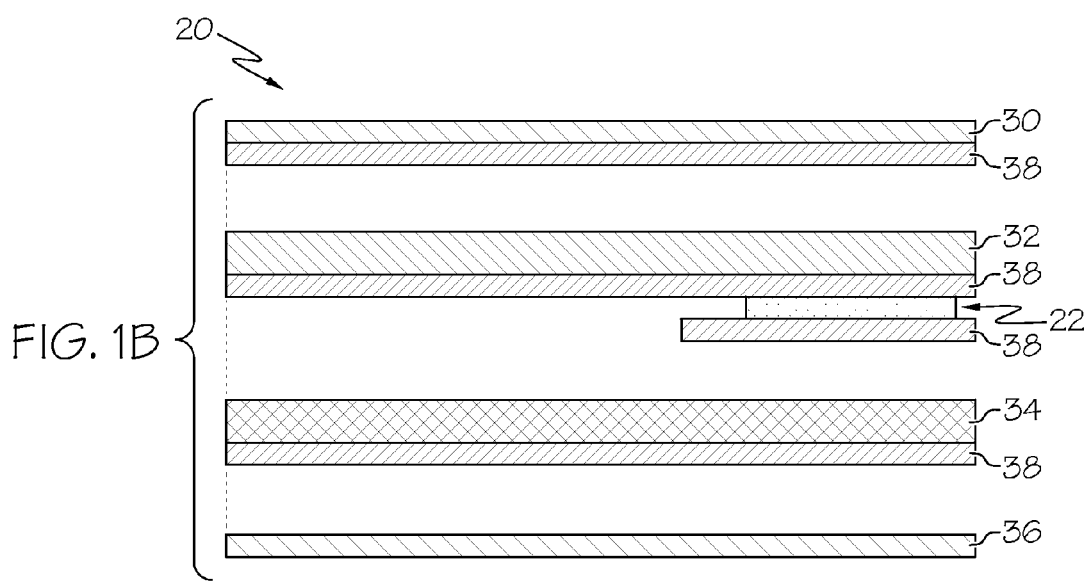
FIG. 1B illustrates a sectional, exploded view taken along line 1B-1B of FIG. 1A.
Figure 2:
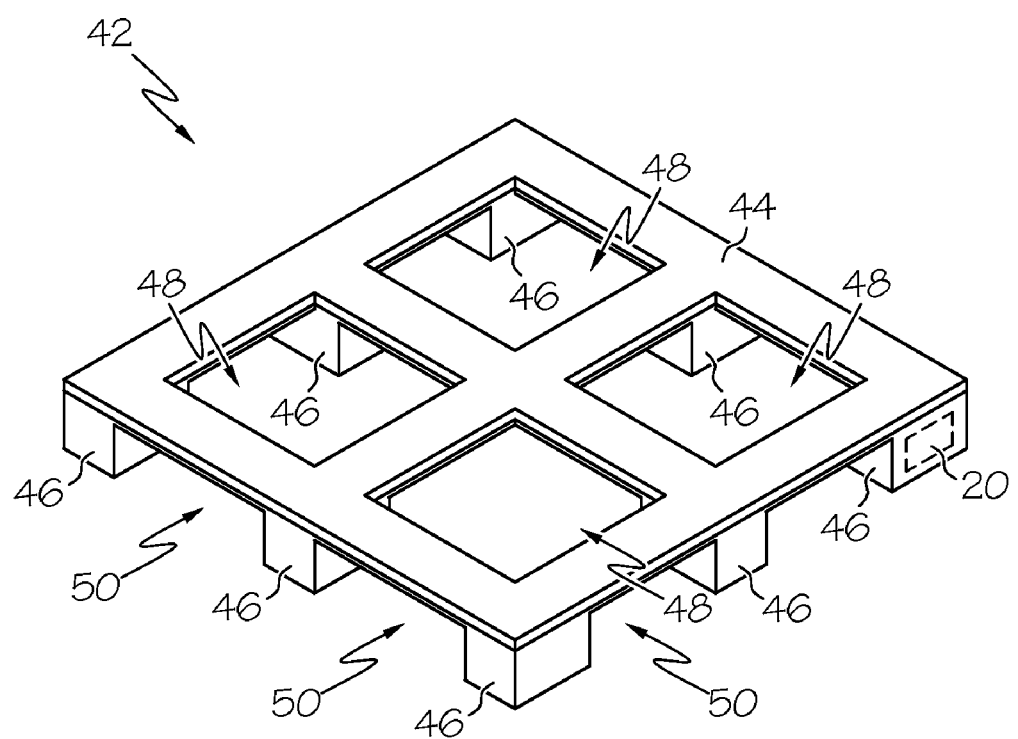
FIG. 2 illustrates a perspective view of an example pallet.

The example laminate placard structure 20 can take the form of that shown in the exploded view of FIG. 1B. As shown, the RFID device 22 can be embedded in between several layers including a top layer 30, an upper intermediate layer 32, a lower intermediate layer 34, and a bottom layer 36, though more or less layers can be used. It is to be understood that the layer arrangement shown in FIG. 1B can include additional layers between or beneath the layers shown. It is also to be understood that the thickness of the various layers are shown exaggerated for ease of reference and are not shown necessarily to scale. Adjacent layers can be adhered to one another in various manners, such as via adhesive (i.e., hot melt adhesive) and/or a layer of pressure sensitive (PSA) adhesive 38. The PSA adhesive 38 may be provided as a portion of any of the above-described layers 30, 32, 34, 36 or may be applied thereto as yet another layer. As shown, the RFID device 22 can be embedded generally between the upper intermediate layer 32 and the lower intermediate layer 34, though it can be located variously about the placard 20. Moreover, though illustrated as having two layers of PSA adhesive 38 on either side thereof, the RFID device 22 may only be adhered with one layer of PSA adhesive 38 (either above or below). Further, an adhesive backing (not shown) may be included on either of the top or bottom layers 30, 36 for coupling the placard 20 to an object, though such an adhesive backing is not a preferred embodiment.

The top layer 30 can be a light permeable layer, such as a translucent or transparent clear layer formed of a polymer film or the like. The upper intermediate layer 32 can be a polymer layer, such as a polyethylene layer that can serve as a background for printed indicia 40a, 40b (e.g., part names, serial numbers, company information, advertising, etc.). If indicia 40a, 40b are to be printed, they can either be printed directly on the surface of the upper intermediate layer 32, and/or they can be reverse-printed on the clear top layer 30 before it is adhered to the upper intermediate layer 32 via the PSA adhesive 38. Thus, the upper intermediate layer 32, which can be various colors, such as white, can provide contrast for the printed indicia 40a, 40b. The lower intermediate layer 34 can also be a polyethylene layer similar to that of the upper intermediate layer 32. The bottom layer 36 can also be a light permeable layer, similar to the top layer 30. Indicia (not shown) can also be printed directly on the surface of the lower intermediate layer 34, and/or reverse-printed on the clear bottom layer 36. In another example, any or all of the layers 30, 32, 34, 36 can be heat sensitive so as to permit thermal transfer printing thereon.

The thicknesses of the respective layers can be selected so that the overall thickness of the entire laminate placard structure 20 is relatively thin, preferably not exceeding 1 mm, more preferably 0.5 mm (500 microns), more preferably 0.05 mm (50 microns). Individual layers can be 5-50 microns thick. The layer 38 of PSA adhesive in between the two intermediate layers 32, 34, which sandwiches the RFID device 22 therebetween, should be of sufficient thickness to ensure continuous and intimate contact between the PSA 38 and both the upper and lower intermediate layers 32, 34 around the RFID device 22, to ensure a complete seal between those layers around the RFID device 22. In one embodiment, that PSA layer 38 approaches or equals, or is approximately equal to, the thickness of the RFID device 22.

Embedding the RFID device 22 within the above-described laminate layer structure can help to protect the RFID device 22 from the demanding environments typically encountered by pallets or other reusable objects/containers. For example, the laminate structure can inhibit, such as prevent, common solvents such as sea water, etc., from contacting and corroding or otherwise damaging the RFID device 22.

As described above, the laminate structure typically is provided as a placard 20 having the RFID device 22 embedded within. The placard 20 includes the various layers described above, and can itself be embedded within a reusable object, such as a pallet. For example, the placard 20 can be embedded in one of the braces, planks or other members of the pallet. By providing the placard 20 inside of one of those members, a potential to damage the RFID device 22 can be further reduced. It is recognized that during harsh use, portions of a pallet, such as several planks of the upper and lower surfaces (particularly those near the edges) may become dislodged or even completely lost from the pallet. Therefore, it may be desirable that the placard 20 not be embedded within one of the planks of the upper and lower surfaces. Instead, the placard 20 is preferably embedded within one of the internal brace members to which both upper and lower-face planks are secured.

Figure 3:
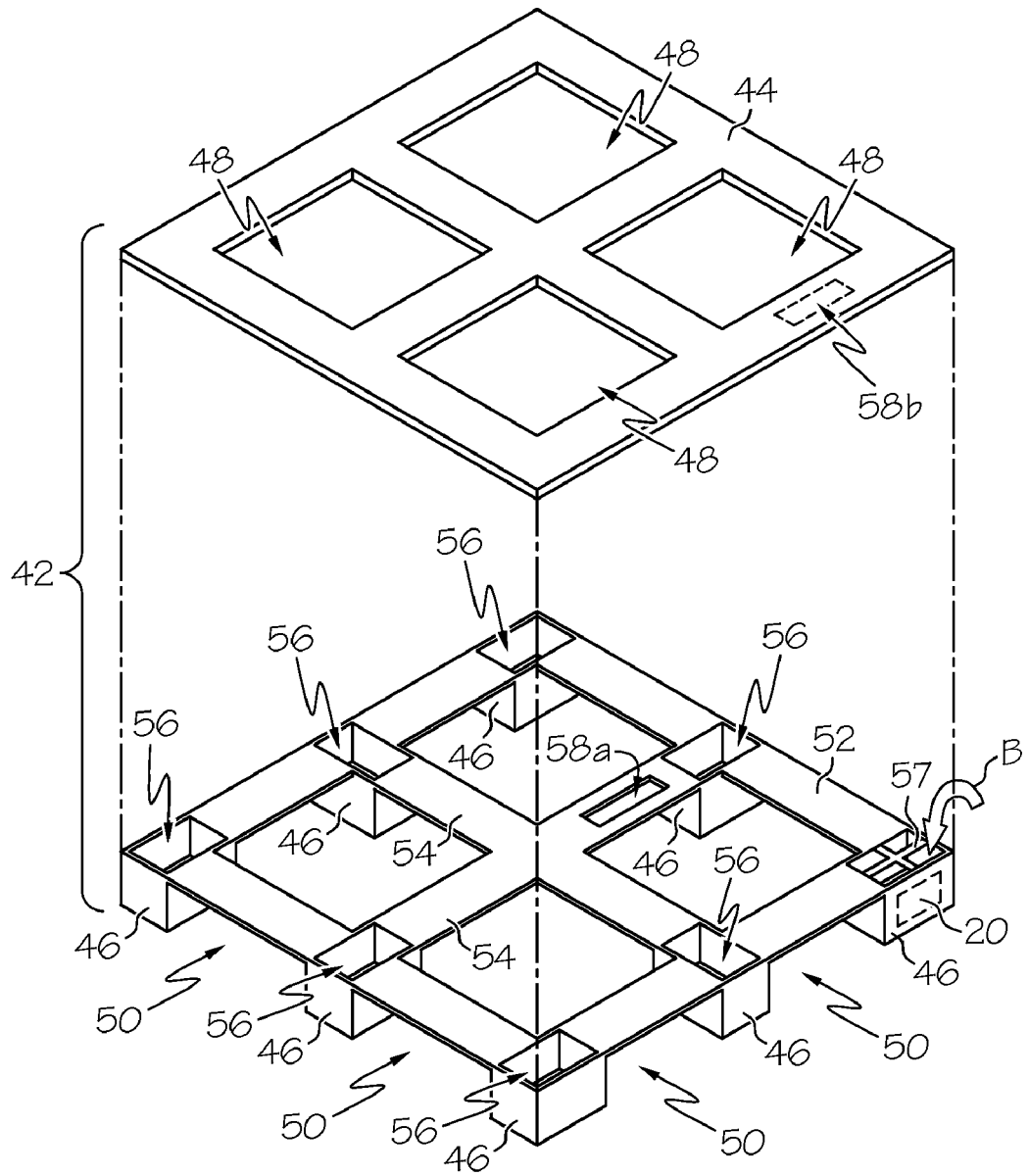
FIG. 3 is similar to FIG. 2, but shows an exploded view.

Turning now to FIG. 3, a typical formed pallet 42 is illustrated. The pallet 42 has at least a top surface 44 supported by one or more feet 46. As shown, the top surface 44 can provide a support surface adapted to support various objects (not shown) to be transported thereon. The top surface 44 can be relatively flat, and may include various surface features to facilitate supporting of various objects thereon. In one example, the top surface 44 can include holes 48 extending therethrough to reduce the weight of the pallet 42, and/or provide ventilation for the objects thereon. The top surface 44 can be supported by eight feet 46, though various other numbers of feet 46 can be used. Moreover, a space 50 between the top surface 44 and a supporting surface, such as the ground, can be adapted to accommodate a forklift or lift-truck, which can lift and manipulate the pallets 42 with goods thereon in a well-known way. Further, the space 50 can also be defined between adjacent ones of the feet 46 and arranged to accommodate the lift-arms of such a forklift or lift-truck as known in the art.

The pallet 42 can be formed of various materials. In the shown example, the formed pallet 42 can include various moldable materials, such as polymers, metals, hard rubbers, etc. For example, the pallet 42 can be formed materials such as plastic, thermoset plastic, polymers, rubber, glass, metals, alloys, polypropylene, acrylonitrile butadiene styrene (ABS), nylon, polyethylene, polyvinyl chloride (PVC) or various combinations thereof.

Still, some or all of the pallet 42 can be formed of other materials or combinations thereof, such as wood or the like. It is to be understood that the RFID device 22 may be adapted or modified to operate with pallets 42 formed of an electrically conductive and/or radio-signal conductive material, such as metal, that may otherwise interfere with the radio transmissions and/or operation of the RFID device 22.

Turning now to FIG. 3, the pallets 42 can be formed of a plurality of elements that are removably or non-removably coupled together. For example, the pallet 42 can include a separate top surface 44 that is coupled to a support base 52 as an example sealing device. The support base 52 can include the plurality of feet 46, and/or various support braces 54 that can be arranged to correspond to the holes 48 of the top surface 44. Each of the top surface 44 and support base 52 can be separately formed, and subsequently coupled together. In one example, each of the top surface 44 and support base 52 can be separately molded from a polymer, such as by injection molding or the like, and then subsequently non-removably coupled together, such as by welding, adhesives, etc.

Either or both of the top surface 44 and the support base 52 can include various interior cavities therein that are adapted to completely receive said placard 20 therein. The cavities can be integrally formed as a portion of the pallet, such as being formed therewith (i.e., molded in or cut into). In one example, the support base 52 can include a cavity 56 within any or all of the plurality of feet 46. Any or all of the cavities 56 can include various supports 57 therein for supporting the top surface 44. In another example, any or all of the support braces 54 of the support base 52, or even portions of the top surface 44, can include cavities 58a, 58b therein. Thus, upon attachment of the top surface 44 to the support base 52, such as by welding or adhesives, the various cavities 56 therein can be sealed and protected from the outside environment.

Figure 4:
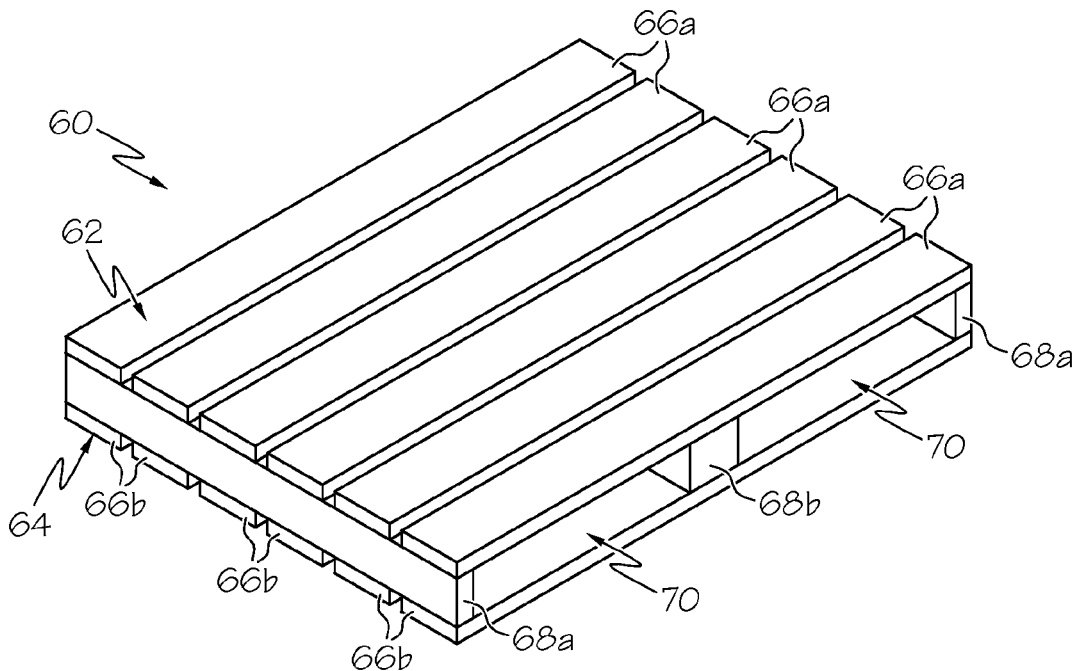
FIG. 4 illustrates a perspective view of another example pallet.

Although the pallet 42 has been described above as a formed pallet, it is to be understood that the pallet can also be a more traditional pallet construction. For example, as shown in FIG. 4, an alternative pallet 60 can include a top surface 62 and a bottom surface 64 provided by respective series of wooden (or other generally rigid material) planks 66a, 66b. The planks 66a, 66b of the top and bottom surfaces 62, 64 can be spaced apart from one another by support braces or members, which can be edge braces 68a or more centrally-disposed braces 68b. It is to be understood that, for purposes of this example, the support braces 68a, 68b can be considered to be a support base, while the wooden planks 66a, 66b can be considered to be a top surface or even a bottom surface. The support braces 68a, 68b can be made of wood, other materials or combinations of them. The space 70 between the top and bottom-surface planks 66a, 66b, and the support braces 68a, 68b, is adapted to accommodate a forklift or lift-truck, which can lift and manipulate the pallets with goods thereon in a well-known way.

Embedding the placard 20 within the interior of one of the pallets 42, 60 can provide increased protection to the RFID device 22 compared to conventional placements, such as being merely adhered to an exterior of the pallet 42, 60. In such an exterior position, the placard 20 would be exposed to all of the elements and harsh conditions and environments where pallets are conventionally used. Moreover, the placards 20 may be subject to being sheared off or removed, whether intentionally or unintentionally. By embedding the placards 20 inside the pallet 42, 60, the risk of accidental or even intentional removal of the placard 20 can be reduced, such as minimized.

Figure 5:
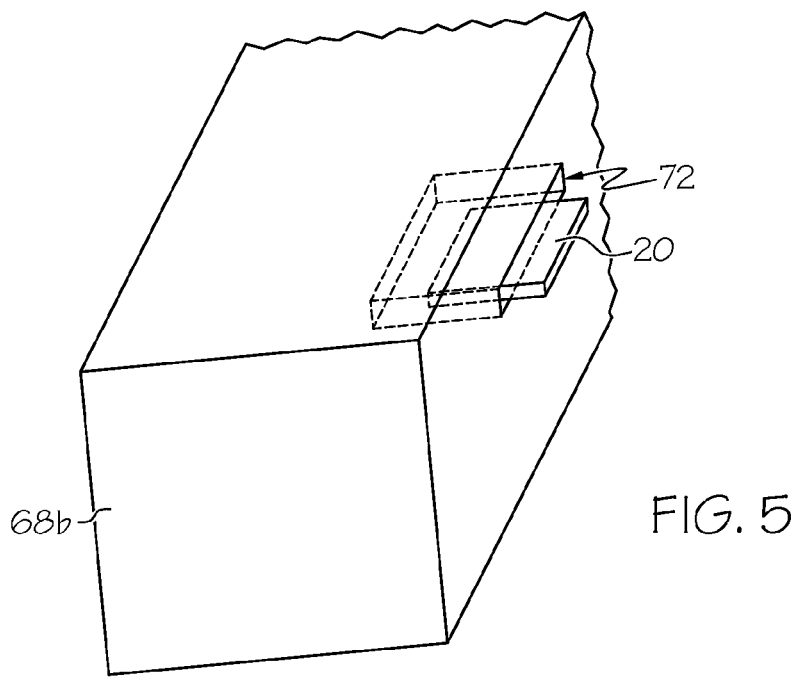
FIG. 5 illustrates one example of the RFID device being embedded in a portion of a pallet.

The placard 20 can be embedded in the pallet 42, 60 in various manners. In one example, as described above, various internal cavities 56, 58a, 58b can be formed within the pallets 42, 60. In another example, as shown in FIG. 5, the internal cavity can be a narrow slot 72 that can be integrally formed, such as cut, molded, or machined, into a portion of the pallet 42, 60 for accommodating the placard 20 therein. For example, the slot 72 can be formed in one of the braces 68a, 68b or the planks 66a, 66b, though it can be more beneficial in one of the braces 68a, 68b because the planks 66a, 66b may be inadvertently damaged, removed, fall off, etc. The slot 72 can be located variously about the braces 68a, 68b or the planks 66a, 66b, such as towards an end thereof. In addition or alternatively, a plurality of slots 72 could be provided to permit a user to decide which to embed the placard 20 therein, or alternatively to permit a plurality of placards 20 to be utilized. The slot 72 can be sufficiently wide among all dimensions such that the placard 20 can be easily slid therein, or it can be narrow enough relative to any or all of the dimensions of the placard 20 to provide an interference-type fit. Still, the interference should not be so severe as to damage or inhibit the performance of the RFID device 22 on insertion of the placard 20 into the slot 72. The slot 72 is illustrated schematically in FIG. 5 with the placard 20 only partially inserted therein for purposes of illustration. It can be desirable that the depth of the slot 72 is sufficient such that the placard 20 can be completely contained therein so as to be embedded in the pallet 42, 60.

Figure 6:
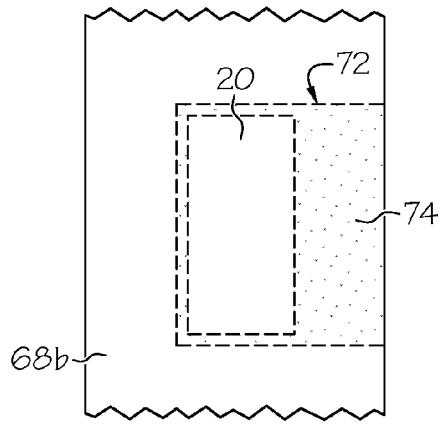
FIG. 6 illustrates another example of the RFID device being embedded in a portion of a pallet.

The placards 20 can be secured within the slot 72 in various manners using various sealing devices. In one example, as described above, the placards 20 can be secured within the slot 72 by an interference fit. In another example, as shown in FIG. 6, a filler material 74 or other material can be inserted or injected to close off the slot 72 after the placard 20 has been inserted therein to inhibit, such as prevent, the placard 20 from falling out. Various filler materials 74 can be used, such as adhesives, molten polymer, etc. In one example, the filler material 74 can be a flowable liquid material that can flow within the slot 72 and about the placard 20 and seal the placard 20 within the slot 72. The flowable filler material 74 may harden and cure into a semi-solid or even solid state. Generally, the filler material 74 can be resistant to various environmental elements, such as being water-resistant, waterproof, corrosion resistant, shock-resistant, etc. so as to provide protection for the placard 20 and RFID device 22. It is to be understood that the filler material 74 generally should not interfere with the radio transmissions and/or operation of the RFID device 22, though may be adapted to strengthen or amplify such operations/transmissions. It is also to be understood that the filler material 74 can even be utilized wherein an interference fit is used to secure the placard 20, though the filler material 74 may also be omitted.

In another example, the slot 72 can be provided on an open portion of the braces 68a, 68b or the planks 66a, 66b that will be subsequently covered and therefore sealed off by another portion of the pallet 42, 60 upon assembly thereof. For example, the slot 72 can be covered by one or more planks 66a, 66b, the top surface 44, etc. so as to close and/or seal off the slot 72. In this example, a filler material 74 may be desirable as an additional precaution to further seal the slot 72 to provide additional protection for the placard 20 in the event the covering member were to be dislodged from the pallet 42, 60 thus exposing the slot 72.

It is to be understood that if the pallet 42, 60 is molded from a polymer or composite material, then it can be molded with the slot 72 pre-formed therein. In yet another example, where the pallet 42, 60 is molded from a polymer or composite material, the placard 20 can be inserted into a portion of the pallet 42, 60 (e.g., braces 68a, 68b, planks 66a, 66b, top surface 44, support base 52, etc.) before the pallet 42, 60 has fully cured, such as when the pallet 42, 60 is hot or warm and in a semi-solid state. In such an example, the placard 20 would then be integrally molded and embedded into the pallet 42, 60. Alternatively, the placard 20 could be otherwise incorporated into the molding process, such as otherwise described herein, so as to be integrally molded and embedded therein. Thus, the various materials used to form the placard 20 and the RFID device 22 can be adapted to withstand the molding temperatures of the pallet 42, 60 material, such as between about 300 to 500 degrees Fahrenheit (i.e., about 150 to 260 degrees Centigrade).

Figure 7:
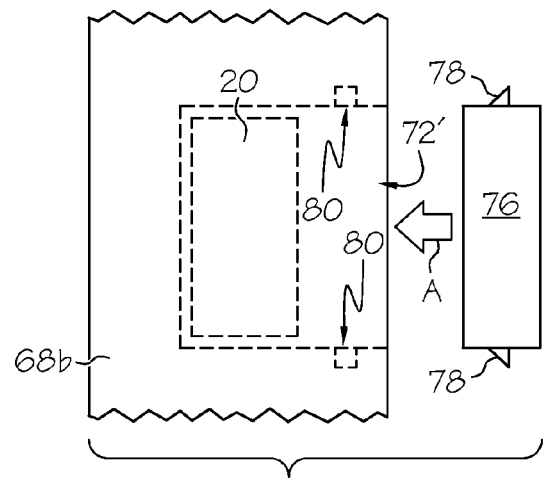
FIG. 7 illustrates yet another example of the RFID device being embedded in a portion of a pallet.

In yet another example sealing device, as shown in FIG. 7, a closure member 76 such as a separately-molded closure member can be provided to close and/or seal the slot 72' after the placard 20 has been inserted. The closure member 76 may or may not be used with a filler material 74 (either before or after insertion into the slot) and/or where the placard 20 is otherwise secured by an interference fit. Generally, the closure member 76 can be resistant to various environmental elements, such as being water-resistant, water-proof, corrosion resistant, shock-resistant, etc. so as to provide protection for the placard 20 and RFID device 22. It is to be understood that the closure member 76 generally should not interfere with the radio transmissions and/or operation of the RFID device 22, though may be adapted to strengthen or amplify such operations/transmissions.

The closure member 76 can be inserted into the slot 72' along the direction of arrow A and secured within the slot 72' in various manners. In one example, the closure member 76 can be secured by an adhesives, welding, integral molding (such as insertion before the molded pallet has cured), and/or even an interference fit with the slot 72'. In another example, the closure member 76 can be provided with one or more locking tabs 78 adapted to interface with corresponding apertures 80 within the slot 72' to inhibit, such as prevent, removal thereof once completely inserted into the slot 72'. The locking tabs 78 may be rigid, resiliently deformable, spring-loaded, etc. Similarly, the locking tabs 78 may include a tapered or ramped geometry to facilitate insertion into the slot 72' while inhibiting, such as preventing, removal therefrom. Although not shown, it is to be understood that the closure member 76 can be provided with the corresponding apertures 80 while the slot 72' is provided with the one or more locking tabs 78.

In still yet another example, turning back to FIG. 3, the placard 20 can be inserted into one of the various cavities 56, 58a, 58b of the formed pallet 42. For example, the placard 20 can be inserted into one of the various cavities 56, 58a, 58b before the top surface 44 is removably or non-removably secured to the support base 52. For example, the placard 20 can be inserted along the direction of arrow B into one of the foot cavities 56, and may be inserted between the various supports 57 therein. It can be beneficial to non-removably secure the top surface 44 to the support base 52, such as by adhesives or welding, so as to seal and embed the placard 20 and RFID device 22 therein so as to provide protection therefore. The embedding of the placard and RFID device 22 can be performed while the components of the molded pallet 46 are still warm (i.e., pre-cure) to facilitate embedding of the placard 20 therein. In addition or alternatively, any or all of a filler material, closure member, and/or interference fit may also be utilized to further secure the placard 20 within the pallet 46.

Figure 8:
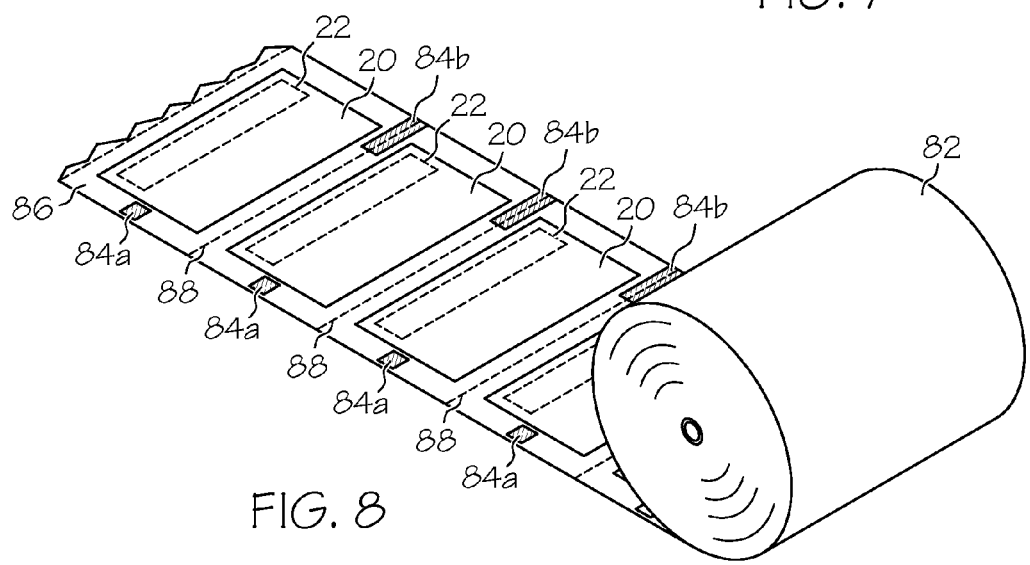
FIG. 8 illustrates a plurality of RFID devices stored on an example roll.

The placards 20 can be manufactured using various methodologies. In one example, as shown in FIG. 8, the placards 20 can be manufactured in a rolled form 82 to facilitate storage, transportation, etc. That is, the placards 20 can be manufactured in or as part of a continuous carrier web 86 to which RFID devices 22 are embedded at periodic locations along the continuous carrier web 86. The web can be manufactured as a continuous length composite having the four layers 30, 32, 34, 36 mentioned above joined by intermediate PSA layers 38 to embed the RFID devices 22 therein at spaced intervals along its length. Optionally, indicia 84a, 84b can be provided (e.g., printed, laminated, molded, etc.) at spaced locations on the continuous carrier web 86 corresponding to the spacing of the RFID devices 22 along the web 86. For example, the indicia 84a, 84b can be provided as firing marks that can be read by a machine, such as a printer, die cutter, perforator, RFID reader, etc. to notify the machine to perform an appropriate action (e.g., printing, die cutting, perforating, RFID read or encoding, etc.) during a manufacturing process. As shown, the indicia 84a can be provided on the continuous carrier web 86 and not in contact with the placard 20 (e.g., such as on a waste portion of the web 86), and/or the indicia 84b can be provided on the continuous carrier web 86 and at least partially in contact with the placard 20.

Individual placards 20, each containing an RFID device 22 and optionally the indicia 84a, 84b, can then can be separated, such as kiss-cut, die-cut, etc. from the continuous web 86. Waste portions of the carrier web 86, such as the edges or the like, can be removed. In addition or alternatively, such as where the placards 20 are to be manufactured at a location remote from where they are to be used or inserted into pallets 42, 60, perforation lines 88 may be provided in the web 86 so that individual such placards 20 can be separated from one another in the web for individual use at a later time. In this instance, the individual placards 20 can be separated from adjacent ones by the perforated "tear" line 88. Moreover, although the placards 20 are illustrated as being provided a single column, it is to be understood that various numbers of placards 20 can be provided in various arrays, patterns, etc. on the carrier web 86 including various columns and rows. Further, where a plurality of columns and/or rows of placards 20 are provided, additional perforations, kiss-cuts, die-cuts, etc. can be provided such that the placards 20 can be removed individually or in groups.

To make the manufacturing process of the embedded RFID devices 22 within the placards 20 more efficient and/or achieve greater economies of scale, such as via production at high speeds and low cost, the RFID devices 22 can be embedded within the placards 20 at the time of their manufacture. An example integrated procedure is illustrated in the flow diagram of FIG. 9 and is described in the following paragraphs. In this example procedure, the integrated electronic device proceeds through numerous stations running a roll-to-roll setup.

One skilled in the art would realize that there are many methods, materials, and sequences of operations that could be used to accomplish this invention, and that more or less, similar or different, numbers of stations could also be utilized. Moreover, it is to be understood that any or all of the following elements can include any of the various materials, chemical compositions, etc. described throughout this document. Additionally, the various steps as shown in the processes of FIGS. 9-10 are intended to be merely example steps, and it is to be understood that the steps can include various other steps, alternatives, etc. as discussed herein, any or all of which may differ from those example steps shown in FIGS. 9-10.

Figure 9:
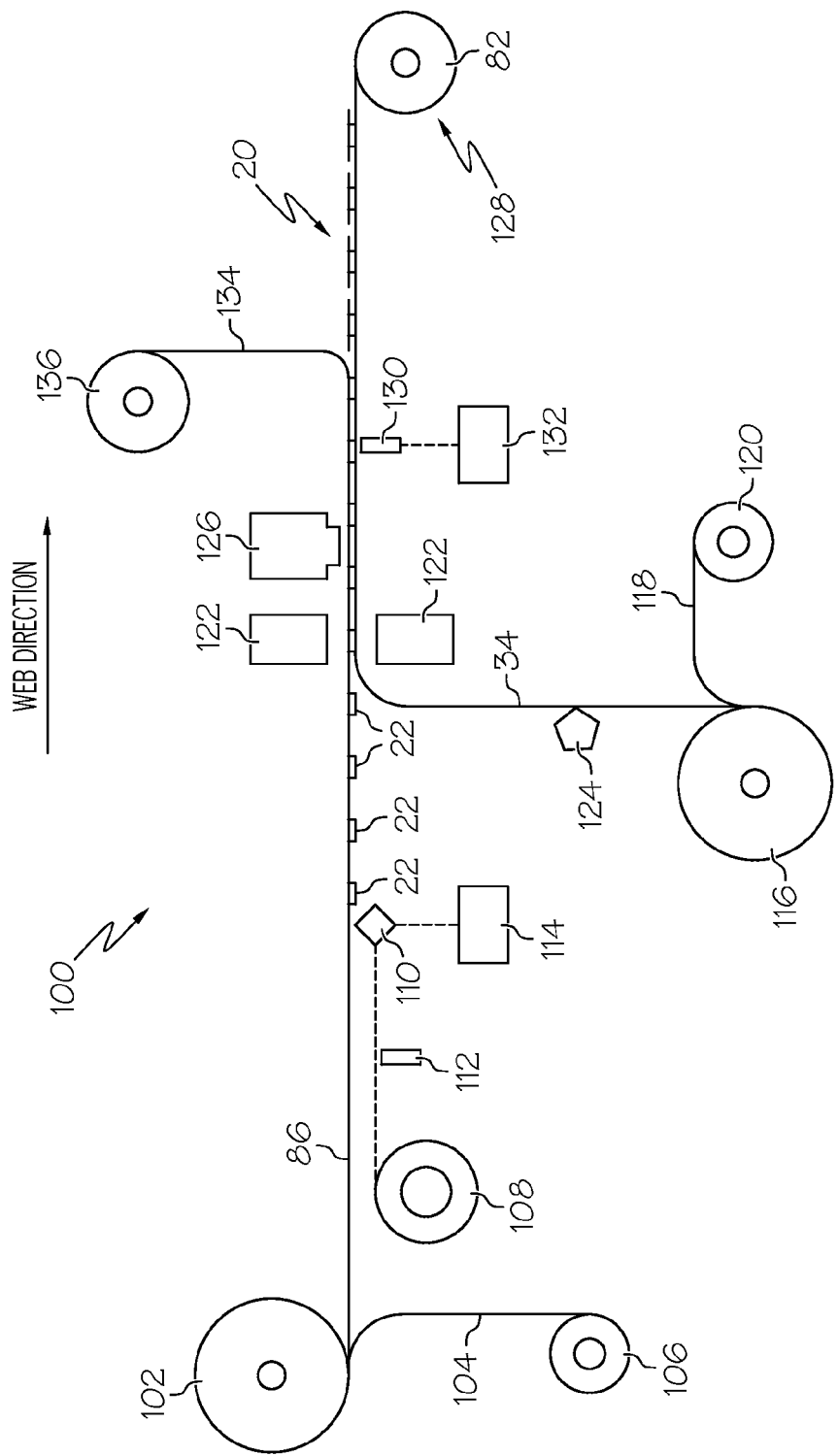
FIG. 9 illustrates a schematic view of an example manufacturing process utilizing a generally continuous web.

Turning now to FIG. 9, a schematic view of an example manufacturing process 100 is illustrated utilizing the generally continuous carrier web 86. As discussed herein, the carrier web 86 can be provided as generally continuous web that can be processed through a "reel-to-reel" style manufacturing process 100. For example, the continuous carrier web 86 can be provided as a generally continuous web from a source station 102, which can be a source roll or the like. The carrier web 86 can be any of the various layers 30, 32, 34, 36 described herein, though for purposes of this example it will be the upper intermediate layer 32. An optional liner layer 104 can be removed from the carrier web 86 and be collected on a waste roll 106 or the like. The liner layer 104 can be removed to expose a PSA adhesive layer 38 or the like.

Next, the RFID devices 22 can be coupled to the carrier web 86. As discussed herein, the completed RFID devices 22 can be provided on a supply roll 108 or the like. Still, any or all portions of the RFID devices 22 can be printed, laminated, or otherwise provided onto the carrier web 86. The completed RFID devices 22 can be laminated onto the carrier web 86 by a cut and inlay device 110 that separates individual RFID devices 22 from the supply roll 108 and inlays or laminates said individual RFID devices 22 onto the carrier web 86 at predetermined intervals. In addition or alternatively, any or all of the RFID devices 22 can be individually tested for operation prior to being coupled to the carrier web 86, such as by a read verify 112 apparatus. The read verify 112 apparatus can transmit and/or receive information to/from the RFID devices 22 to determine operational status. If an RFID device 22 is determined to be operationally sound, it can be coupled to the web 86 by the cut and inlay device 110. However, if the RFID device 22 is determined to be defective, it can be automatically disposed of in a waste receptacle 114 or the like by the cut and inlay device 110 or other device. However, said testing and disposal procedures can also be performed manually.

Next, another web layer can be laminated to the carrier layer 86 to embed the RFID device 22 therebetween. For purposes of this example, said web layer can be the lower intermediate layer 34. The lower intermediate layer 34 can be provided from a supply roll 116, and may have an optional liner layer 118 removed and collected on a waste roll 120 or the like. The liner layer 104 can be removed to expose a PSA adhesive layer 38 or the like. The lower intermediate layer 34 can then be laminated onto the continuous web 86 by a laminating device 122. In addition or alternatively, such as where the lower intermediate layer 34 does not contain a PSA adhesive, or where additional bonding strength is desired beyond that provided by a PSA adhesive, an additional adhesive can be provided. For example, a hot-melt adhesive can be provided by to the lower intermediate layer 34 by an adhesive applicator 124 in either a continuous string, or at discrete locations thereon. It is to be understood that such an adhesive applicator can similarly be provided for the generally continuous web 86.

Next, a cutting device 126 can perform various cutting functions, such as providing perforation lines between individual placards, and/or performing kiss-cuts or die-cuts to the placards 20. Next, any or all of the RFID devices 22 can be again individually tested for operation prior to being provided to the collection station 128, such as by an exit read verify 130 apparatus. The exit read verify 130 apparatus can transmit and/or received information to/from the RFID devices 22 to determine operational status. If an RFID device 22 is determined to be operationally sound, it can be sent onto the collection station 128. However, if the RFID device 22 is determined to be defective, it can be automatically disposed of in a waste receptacle 132 or the like by another device. However, said testing and disposal procedures can also be performed manually. For example, because disposal of an individual placard 20 from the generally continuous web 86 near the end of the manufacturing process 100 can disrupt the web, a defective placard 22 can instead be marked, such as by a printing or punching operation, to notify an end user that a particular placard is defective.

Next, a portion of the web 86 can be trimmed and removed, such as waste edges 134 that can be stored on a waste roll 136 or the like. Said waste edges 134 can have been previously cut or perforated by the cutting device 126. Finally, the individually completed placards 20 can be collected at a collection or take-up station 128, which can include a collection roll, such as the roll 82 previously described herein. It is to be understood that the aforedescribed outer, light permeable layers, such as the top layer 30 and bottom layer 36, can also be provided onto the web 86 at various locations in the manufacturing process 100. In one example, the top layer 30 can already have been provided onto the carrier web 86 (i.e., previously provided on the upper intermediate layer 32) prior to entering the manufacturing process 100, and similarly the bottom layer 36 can have been already provided onto the lower intermediate layer 34 prior to entering the manufacturing process 100. Alternatively, either or both of the top and bottom layers 30, 36 can be provided in rolled form (i.e., similar to rolls 102 or 116, and may include optional liner layers or the like) and laminated onto the web 86 or lower intermediate layer 36, respectively.

One benefit of this generally continuous, web-based manufacturing process 100 (e.g., on continuous carrier web 86) is that the RFID devices 22 can be encoded or programmed, and/or their respective memories imprinted with appropriate information, successively along the line where the web is being manufactured. Alternatively, if produced in roll form, the roll 82 of RFID placards 20 can be first produced and then the web fed from the roll 82 through an RFID encoding/programming station (i.e., such as process 150 described below) in a separate operation to encode the RFID devices 22 or their respective memories with unique information, identifiers, etc. For example, this latter method where the roll 82 is first made and then separately encoded in a separate step (apart from manufacturing the roll itself) can be performed either at the location where the roll 82 is manufactured, or elsewhere, such as at a customer facility. For example, permitting a customer or other third party to program the RFID devices 22 can be desirable if sensitive or confidential information is to be encoded that the customer or third party does not want to disclose to a manufacturer or other party, or otherwise if the needs of the customer or third party may not be known precisely at the time of manufacture. Further, the customer or third party could then program the entire roll of RFID placards 20 at a later date quickly and efficiently based on its then-present need, without having to forecast its needs into the future to tell the web manufacturer how to program the RFID placards 20. This flexibility can greatly reduce the cost and use of time, and improve efficiency, at the location where the individual placards 20 will be used because the placards 20 will already be coded.

As shown in FIG. 10, the placards 20 can be coded quickly and efficiently (and even automatically) in rapid succession in a secondary manufacturing process 150 by feeding the web past an encoding/programming station 152. In one example, the manufacturer can supply each roll 82 of RFID placards 20, such as the roll 82 from the collection station 128 of the preceding manufacturing process 100, together with a master list or manifest (not shown) that identifies the particular codes or other information associated with each lot of placards 20 in the roll 82. For example, "Roll 0001" contains placards whose RFIDs have been encoded with unique identifiers beginning with 00001 (first placard) and ending with 05000 (last placard), while "Roll 0002" contains placards beginning with 05001 (first placard) and ending with 10000 (last placard)," etc. It is to be understood that various naming/encoding schemes can be utilized.

Thus, in the secondary manufacturing process 150, which is schematically illustrated as a roll-to-roll process, the individual placards 20 can unwound from the roll 82 and provided sequentially into the encoding/programming station 152. In one example, a detector 154 can detect a firing mark 84a, 84b of an individual placard 20 and cause a printer 156 to individually print various information on the placards 20. For example, the printed information can include an identifier, a serial number, a part type, manufacturer information, owner information, advertising, etc. The information can be printed directly onto the top surface of the web 86, and/or can even be thermally printed, such as by a thermal transfer printing process or the like. In addition or alternatively, the RFID device 22 of each placard 20 can then be individually encoded by an encoding machine 158. The encoding machine 158 can also be triggered by the firing marks 84a, 84b. The encoded information can be similar or different to the printed information, and may include, for example, an identifier, a serial number, a part type, manufacturer information, owner information, etc. Still, alternatives to the firing marks 84a, 84b can be utilized, such as optical detection systems, timing systems, hole punches, etc. to trigger the machines.

Next, any or all of the encoded placards 20' can be individually checked for operation by an exit read verifier 160 to determine operational status and ensure the previously encoded information has been properly transmitted and stored in the RFID devices 22. If an RFID device 22 is determined to be operationally sound, it can be sent onto the collection station 164. However, if the RFID device 22 is determined to be defective, it can be automatically disposed of in a waste receptacle 162 or the like by another device. However, said testing and disposal procedures can also be performed manually. For example, because disposal of an individual placard 20' from the generally continuous web 86 near the end of the secondary manufacturing process 150 can disrupt the web, a defective placard 20' can instead be marked, such as by a printing or punching operation, to notify an end user that a particular placard is defective.

Finally, any or all of the individual placards 20 can be removably or non-removably embedded into a pallet 42, 60 using any of the aforedescribed methods. The placards 20 can be embedded manually or even automatically using various automation processes. For example, a roll 82 of placards 20 can be fed into a device that individually cuts and embeds the placards 20 into pallets 42, 60 during the manufacturing process thereof, such as during a portion of the molding process. In another example, the collection station 128 can be omitted and the placards 20 can be directly individually cut and embedded into the placards 20 into pallets 42, 60.

The placards 20 have been described above in connection with tracking pallets 42, 60. However, it will be recognized that the disclosed placards 20 with embedded RFID devices 22 could be used to track various other reusable containers or even other items. It will also be appreciated that multiple RFID devices 22 may be incorporated into each laminate placard 20, for example if each RFID device 22 is to store different information or be readable by a different tracking system. For example, the owner of the pallets 42, 60 may want to track the locations of its pallets, to determine who is in possession, etc. for rental/lease payment calculation purposes, whereas the present custodian of the pallet may want to track the pallet for inventory purposes, such as to track its goods that are currently stacked and/or being shipped/transported on the pallet. One RFID device 22 can be provided to be proprietary to and readable only by the owner's interrogation and tracking network, whereas the other RFID device 22 can be provided as readily programmable and usable by the user of the pallet (the pallet-owner's customer or renter).

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A method of embedding an RFID device in a reusable object including the steps of:
   embedding an RFID device in a placard between two adjacent layers thereof, said placard comprising at least top and bottom layers having respective exposed surfaces and having no adhesive layer on the exposed surface of either of said top and bottom layers;
   providing a reusable object having a cavity extending into an interior of the reusable object;
   inserting the placard having said RFID device embedded therein into the cavity so that said placard is located entirely within the interior of said reusable object; and
   non-removably securing the placard within the cavity.

2. The method of claim 1, said reusable object comprising a support base including said cavity, and a top surface; the method further comprising non-removably securing said top surface to said support base after said placard has been inserted into said cavity to thereby embed said placard in said reusable object.

3. The method of claim 2, wherein said support base defines a plurality of support feet for the reusable object, and wherein said cavity is defined within an interior of at least one of said support feet.

4. The method of claim 2, wherein the step of non-removably securing said top surface to said support base is performed by welding.

5. The method of claim 1, wherein said cavity includes a slot.

6. The method of claim 5, further including the step of sealing the slot with a filler material to secure the placard within the slot.

7. The method of claim 5, further including the step of sealing the slot with a closure member to secure the placard within the slot.

8. The method of claim 1, the placard further comprising an upper intermediate layer and a lower intermediate layer disposed between said top and bottom layers; said RFID device being embedded between said upper and lower intermediate layers.

9. The method of claim 8, further including the step of printing indicia on at least one of the top and bottom layers, said indicia being selected from the group consisting of indicia that display at least one of the following: a part name, a serial number, company information and advertising information.

10. A method of embedding an RFID device in a reusable object, including the steps of:
providing a placard including at least a top layer, an upper intermediate layer, a lower intermediate layer, and a bottom layer, said top and bottom layers having respective exposed surfaces, said placard having no adhesive layer on the exposed surface of either of said top and bottom layers, wherein an RFID device is embedded in the placard between adjacent layers thereof;
providing a reusable object having a cavity extending into an interior of the reusable object;
inserting the placard into said cavity so that the embedded placard is located entirely within said cavity; and
non-removably securing said placard having said RFID device embedded therein within said cavity.

11. The method of claim 10, said reusable object comprising a support base including said cavity, and a top surface; the method further comprising non-removably securing said top surface to said support base after said placard has been inserted into said cavity to thereby embed said placard in said reusable object.

12. The method of claim 11, wherein said support base defines a plurality of support feet, and wherein said cavity is defined within an interior of at least one of said support feet.

13. The method of claim 10, wherein said cavity is a slot and wherein said method further includes the step of sealing said slot with at least one of a filler material and a closure member to secure said placard within the slot.

14. A reusable object structure, including:
a placard including at least a top layer and a bottom layer having respective exposed surfaces, and having no adhesive layer on the exposed surface of either of said top and bottom layers;
an RFID device embedded in the placard between adjacent layers thereof and including an integrated circuit coupled to an antenna; and
a reusable object including an interior cavity that is integrally formed as a portion of said reusable object and adapted to completely receive said placard therein; and
said placard being non-removably sealed within said cavity.

15. The reusable object structure of claim 14, wherein said reusable object includes a support base and said sealing device includes a top surface, said cavity extending into an interior of at least one of said support base and top surface, and wherein said support base and top surface are non-removably secured together after the placard is received within said cavity to non-removably seal said placard therein.

16. The reusable object structure of claim 14, further including a filler material at least partially received within said interior cavity to seal said placard therein.

17. The reusable object structure of claim 14, further including a firing mark provided on an exterior portion of said placard that is adapted to notify a machine to perform an appropriate action on said placard during manufacturing thereof.

18. The method of claim 1, said cavity extending from an opening in an exterior surface of said reusable object to an interior of said reusable object, said placard being inserted into said cavity through said opening.

19. The method of claim 1, said placard having a thickness not exceeding 1 mm.

20. The method of claim 1, said placard having a thickness not exceeding 0.5 mm.

21. The method of claim 1, said placard further comprising a layer of pressure-sensitive adhesive in between the adjacent layers wherein said RFID device is embedded, said pressure-sensitive adhesive layer having sufficient thickness to ensure continuous and intimate contact with both said adjacent layers around the RFID device, to thereby ensure a complete seal between those layers around the RFID device.

22. The method of claim 21, said pressure-sensitive adhesive layer having a thickness approximately equal to that of said RFID device.

23. The reusable object structure of claim 14, said cavity extending from an opening in an exterior surface of said reusable object to an interior of said reusable object, said placard being inserted into said cavity through said opening.

24. The reusable object structure of claim 14, said placard having a thickness not exceeding 1 mm.

25. The reusable object structure of claim 14, said placard having a thickness not exceeding 0.5 mm.

26. The reusable object structure of claim 14, said placard further comprising a layer of pressure-sensitive adhesive in between said adjacent layers wherein said RFID device is embedded, said pressure-sensitive adhesive layer having sufficient thickness to ensure continuous and intimate contact with both said adjacent layers around the RFID device, to thereby ensure a complete seal between those layers around the RFID device.

27. The reusable object structure claim 26, said pressure-sensitive adhesive layer having a thickness approximately equal to that of said RFID device.

28. The reusable object structure of claim 14, said placard further including an upper intermediate layer and a lower intermediate layer in between said top and bottom layers, and a plurality of adhesive layers between adjacent ones of said top layer, upper intermediate layer, lower intermediate layer and bottom layer.

29. The method of claim 1, said reusable object being a reusable container.

30. The reusable object structure of claim 14, said reusable object being a reusable container.

* * * * *